W. C. BURRELL.
ANIMAL FEEDING DEVICE.
APPLICATION FILED AUG. 10, 1918.

1,301,383.

Patented Apr. 22, 1919.

Inventor,
W. C. Burrell, by
G. C. Kennedy,
Attorney.

UNITED STATES PATENT OFFICE.

WILLIAM C. BURRELL, OF KANKAKEE, ILLINOIS.

ANIMAL-FEEDING DEVICE.

1,301,383.   Specification of Letters Patent.   Patented Apr. 22, 1919.

Application filed August 10, 1918. Serial No. 249,251.

*To all whom it may concern:*

Be it known that I, WILLIAM C. BURRELL, a citizen of the United States of America, and a resident of Kankakee, Kankakee county, Illinois, have invented certain new and useful Improvements in Animal-Feeding Devices, of which the following is a specification.

My invention relates to improvements in animal feeding devices, and the object of my improvement is to supply a feed receptacle for communicating with a feed container, and combining with both mechanism operable to open or close said communication and to stir the contents of the container adjacent to the communication, said mechanism adapted for actuation by an animal in moving the receptacle closure preliminarily to feeding from the receptacle.

Figure 1:
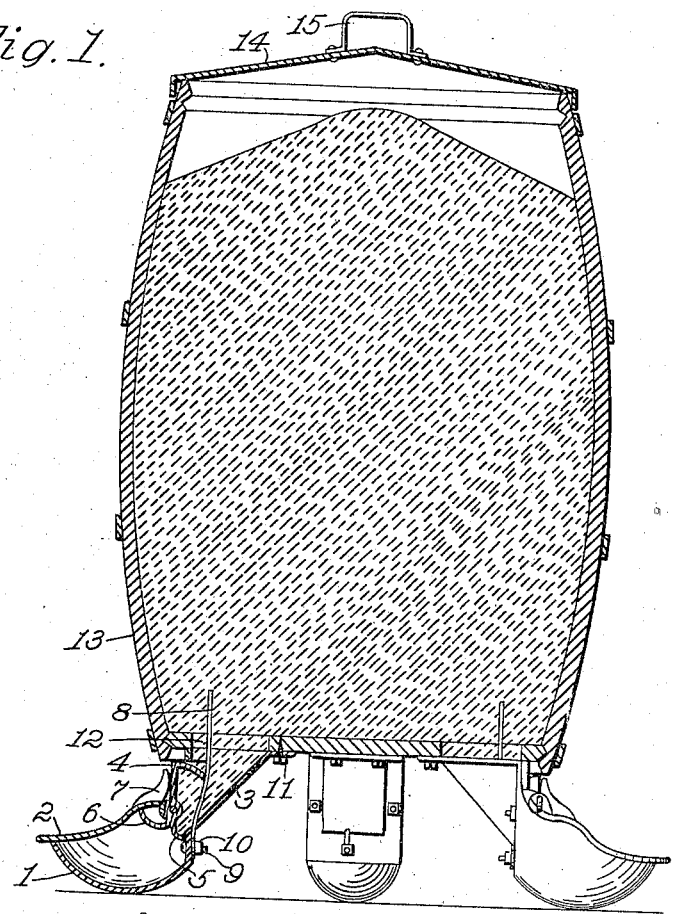
Figure 2:
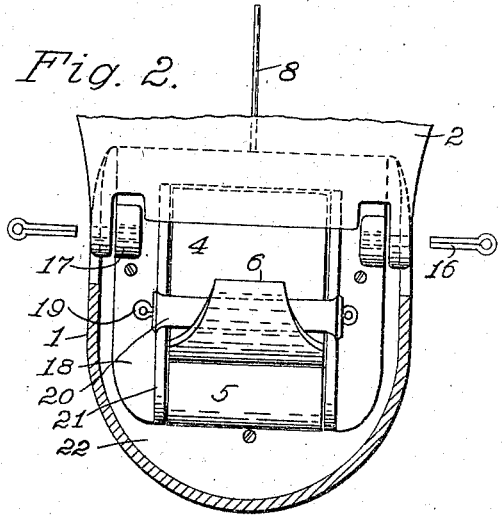

This object I have accomplished by the means which are hereinafter described and claimed, and which are illustrated in the accompanying drawings, in which Figure 1 is a vertical central longitudinal section of a barrel container, showing a plurality of my improved feeder receptacles and mechanisms in communication therewith, of which one is in section, the others shown in elevation. Fig. 2 is an enlarged cross-section of one of said receptacles, with the interior mechanism in front elevation.

Similar numerals of reference denote corresponding parts throughout the several views.

The feed-container 13 may be of any form or type, but as shown, consists of an ordinary barrel with the top head removed, and provided with a removable cover 14 having a handle 15. Such a barrel is easily procured by anyone at small expense, and therefore may be usefully and economically employed with my improved feeding devices, as a plurality of them may be removably associated therewith if desired.

The bottom head of the barrel may have as many delivery openings or ports 12 as decided upon to supply a like number of said feeding devices.

Each of my feeding devices used in communication with said container 13, comprises a bowl-shaped receptacle 1 having a rear raised vertical wall including an integral sloped conduit part 3, all preferably made in a single casting, the part 3 having a horizontal terminal flange orificed to receive screws 11 to secure it to said barrel with the conduit 3 in communication with a delivery-port 12. The forward upper part of the receptacle is open, and I have provided a closure 2 therefor hingedly connected thereto, said closure having on the rear of its upper surface a curved projection 7 for a purpose to be hereinafter disclosed. The vertical part of the rear wall of said receptacle 1 is carried up as a partition or septum 22 across the conduit 3, said septum 22 having a rectangular opening coinciding with the lower or delivery end of said conduit, said opening being closed by a pivoted gate 4—5.

A plate 18 is secured upon the front face of the septum 22 and has a rectangular opening registering with the opening in the septum with raised border flanges 21 on each side, a cross-bar 20 integrally connecting the middle parts of said flanges.

The gate-body 4—5 is positioned across the said registering openings and pivoted on each side medially to the said flanges 21 on removable pintle-pins or split-keys 19 inserted through orifices in the flanges into sockets in the gate. The gate has on its front face an upwardly-projecting curved finger 6, which, as shown in Fig. 1, normally has its tip in contact with the lower face of the closure 2, while the latter is in its closed position.

The rear end of the closure 2 has lugs which are hingedly connected to lugs 17 on the plate 18 by split-keys 16 or other form of removable pintles.

The upper part 4 of the gate 4—5 extends upwardly and then is curved rearwardly into the hollow of the conduit 3. An elastic wire 8 has an eye formed at its lower end, said eye being secured to the rear of the receptacle 1 by means of a bolt 9 and nut 10, the wire extending upwardly through a small orifice in said conduit 3 through the port 12 and a short distance into the container 13. The rearwardly curved part 4 extends into contact with the wire 8 when the closure 2 is down, in fact engages it to somewhat compress it as shown, the spring reaction keeping the gate vertical and with its curved lower end 5 closing said conduit 3.

Since the projection 7 on the closure is in contact with the front face of the gate 4—5 above its pivots, it is obvious that when an animal, such as a hog, lifts up the closure 2 by means of its projecting rim, the projection 7 will press back the upper part 4 of said gate, compressively pushing back the resilient wire 8, while the curved lower part 5 of the gate is rocked forwardly as the closure ascends, opening the conduit 3 and permitting a portion of the ground feed in the container 13 to flow through the conduit into said receptacle 1. When the animal withdraws from under the closure 2, the latter is returned to its former closed position and retained there partly by its own gravity, as also by the reaction of the wire 8 acting through the gate part 4 and the projection 7, also rocking the gate to its closed position. It will be observed that no feed can issue from the conduit only when the animal is feeding from the receptacle, and that the automatic closing down of the closure 2 closes the receptacle, so that fowls and birds cannot feed therefrom, while the closure keeps out rain and dust.

The wire 8 being actuated each time the device is used, stirs up the feed in the approaches to the receptacle 1, preventing caking and insuring free flowing.

Various changes may be effected in this device without departing from the invention, and as many of the devices employed in communication with one container as desired.

Having described my invention, what I claim as new, and desire to secure by Letters Patent, is:

1. In an animal feeding device, a container having a delivery-port, a receptacle having a communication with said port, and means, including a medially pivoted gate mounted in said communication, a closure for the receptacle, and a resilient tension element operatively assembled and adapted to effect a closure of said communication when the closure is lowered and open the communication when the closure is raised.

2. In an animal feeding device, a container having a delivery-port, a receptacle having a communication with said port, and means, including a movable closure for said receptacle, operatively assembled and adapted to open or close said communication when the closure is raised or lowered respectively, said means also including means for stirring the contents of the receptacle at said communication when the closure is moved to and fro.

3. In an animal feeding device, a container having a delivery-port, a receptacle having a communication with said port, a closure for said receptacle hinged thereto and having a projection, a resilient body extending into the said communication, and a movable body interposed between said closure projection and said resilient body adapted to be moved by the projection when the closure is raised to compress the resilient body, the resilient body reactively returning when the closure and its projection are lowered, returning the interposed body to its first position.

4. In an animal feeding device, a container having a delivery-port, a receptacle having a conduit in communication with said delivery-port, a movable closure for said receptacle, stirring-means extending through said conduit, into the container, and means actuated by said closure to agitate said stirring-means when the closure is moved to and fro.

5. In an animal feeding device, a container having a delivery-port, a receptacle having a conduit in communication with said delivery-port, a movable closure for said receptacle, stirring-means extending through said conduit into said container, a gate supported movably in said conduit, and means actuated by said closure when moved to and fro to both agitate said stirring-means and open or close said gate.

6. In an animal feeding device, a container having a delivery-port, a receptacle having a conduit in communication with said delivery-port, a movable closure for said receptacle, a gate supported movably in said conduit, said closure and gate having each contacting projections whereby when the closure is moved to and fro, the gate is moved to and fro.

7. In an animal feeding device, a barrel-shaped container having a delivery-port, a receptacle removably mounted on the container in communication with said delivery-port, resilient stirring-means secured at one end to the receptacle and extending through said communication into the container, and mechanism for alternately compressing and releasing said stirring-means.

8. In an animal feeding device, a container having a delivery-port, a receptacle having a conduit leading to and receiving from said port, means for governing the flow of contents of the container through said conduit into said receptacle, and a resilient arm fixed at one end for stirring the contents of the container at or near the said delivery-port operatively assembled with said governing means and operable synchronously therewith.

9. In an animal feeding device, a receptacle having a conduit adapted to be assembled with the delivery-port of a container, a closure for the receptacle covering the same and hinged thereto, a gate normally closing the communication between the receptacle and its said conduit having a projection contacting the under face of said closure to retain the gate in closed position when the closure is closed, said gate having another projection movably contacted by the upper part of said closure, the closure when lifted moving the last-mentioned gate projection to rock said gate open.

10. In an animal feeding device, a receptacle having a conduit adapted to be assembled with the delivery-port of a container, a closure for the receptacle top hinged thereto, a gate positioned pivotally within the receptacle to close the communication between the receptacle and the said conduit, a resilient rod extending through said conduit, and said gate having projections engaging said closure and said rod, whereby when the closure is lifted the gate is rocked to open position and the rod compressively moved in one direction, and when the closure is lowered the gate is rocked back to a closed position and the rod allowed to react to both yieldingly retain the closure closed and the gate shut.

11. In an animal feeding device, an open top vessel adapted for communication with a supply of feed material, and a gate hung swingingly to close said communication and having a projection, and resiliently controlled means acting upon said gate projection to normally close it yieldingly.

12. In an animal feeding device, an open top vessel having a conduit in communication with a supply of feed material, a gate hung swingingly in said vessel to close said conduit, and a resilient agitating device within the conduit to stir its contents, said resilient device bearing against said gate, and said gate having an outer projection adapted for employment in swinging the gate to opened position while simultaneously tensioning said agitating device to stir the contents of the conduit.

Signed at Waterloo, Iowa, this 25th day of July, 1918.

WILLIAM C. BURRELL.

Copies of this patent may be obtained for five cents each, by addressing the "Commissioner of Patents, Washington, D. C."